United States Patent
Torvmark et al.

(10) Patent No.: US 8,346,592 B2
(45) Date of Patent: Jan. 1, 2013

(54) METHOD AND SYSTEM FOR DETERMINING A THREAT AGAINST A BORDER

(75) Inventors: Halvor Torvmark, Eidsvoll Verk (NO); Ove Hellvik, Oslo (NO)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 295 days.

(21) Appl. No.: 12/444,816

(22) PCT Filed: Oct. 9, 2006

(86) PCT No.: PCT/NO2006/000350
§ 371 (c)(1),
(2), (4) Date: Apr. 8, 2009

(87) PCT Pub. No.: WO2008/044934
PCT Pub. Date: Apr. 17, 2008

(65) Prior Publication Data
US 2010/0023364 A1    Jan. 28, 2010

(51) Int. Cl.
*G06Q 10/00* (2012.01)
(52) U.S. Cl. ........................................... 705/7.28
(58) Field of Classification Search ............... 705/7.28
See application file for complete search history.

(56) References Cited

U.S. PATENT DOCUMENTS

| | | | |
|---|---|---|---|
| 5,559,496 A | 9/1996 | Dubats | |
| 7,746,794 B2 * | 6/2010 | Sink | 370/245 |
| 2007/0100642 A1 * | 5/2007 | Paulus et al. | 705/1 |
| 2007/0236343 A1 * | 10/2007 | Becksted et al. | 340/521 |

OTHER PUBLICATIONS

BBC Monitoring Former Soviet Union, "Border Must Be Impregnable, Says Ukrainian Border Official," Aug. 12, 2004, p. 1.*

* cited by examiner

*Primary Examiner* — Nathan Erb (57) ABSTRACT

A method for determining a threat against a border from objects crossing or trying to cross said border. Said method includes at least the steps of segmenting the border into border elements of uniform terrain features, infrastructure and weather conditions, collecting data of incidents occurring along a given border element, determining a threat potential for said border element, determining a protection factor for the border element, and determining a threat against the border element from the threat potential and protection factor. The method may be used for warning about an increased threat to a border, wherein the threat is compared with a threat value threshold. If the threat exceeds the threat value threshold, an alarm is issued. The method may also be used for allocating protective measures along a border.

10 Claims, 5 Drawing Sheets

METHOD AND SYSTEM FOR DETERMINING A THREAT AGAINST A BORDER

FIELD OF THE INVENTION

The present invention relates to a system and method used in the protection of borders, and in particular the borders of a country or state, against intruders of various kinds.

TECHNICAL BACKGROUND

In a modern society, a country must protect itself against persons passing its borders outside the official or legal points of entry. The persons in question may have various motifs for wanting to hide their entry into a country. This may be illegal immigration, smuggling, terrorism, etc. In order to protect the borders, various measures may be taken. This may be physical hindrances, such as fences, various detectors for observing the border line, such as cameras, radars, infrared line detectors, seismic detectors, or manual control by border patrols. The detectors are normally connected to a border station, which is also headquarter for border patrols. Thus, the border station will receive information as alarms from the detectors as well as observations reported by border patrols. This information should be used to devise countermeasures against possible intruders, either by sending out border patrols to apprehend offenders or by relocating resources, that is fencing and detectors, in order to make the border as tight as possible. However, the scattered information received in the border station is not easy to exploit. The information supplied by border patrols passing at regular intervals may not be representative for the real situation at the border. In addition, a detector may tell that an object has passed the border, but not how severe the intrusion is, i.e. detectors may be tripped by squirrels as well as terrorists. Thus, there is a need for a structured approach for disseminating information gathered in a border station.

In many ways, the situation depicted above corresponds to the threats posed against computer networks by virus and malicious hackers. However, the technique used in firewalls and protection software does not readily lend itself for protecting physical assets or the borders of a country.

SUMMARY OF THE INVENTION

It is an object of the invention to provide a solution to the problems mentioned above, and in particular to provide a method and system for determining the threat against a border. The invention may be used for optimal resource allocation to produce a good protection of said border, or the best protection possible with the available resources.

In particular, it is an object to provide a method for determining a threat against a border from objects crossing or trying to cross said border. Said method includes at least the steps of segmenting the border into border elements of uniform terrain features, infrastructure and weather conditions, collecting data of incidents occurring along a given border element, determining a threat potential for said border element, determining a protection factor for the border element, and determining a threat against the border element from the threat potential and protection factor.

The method may be used for warning about an increased threat to a border, wherein the threat is compared with a threat value threshold. If the threat exceeds the threat value threshold, an alarm is issued.

The method may also be used for allocating protective measures along a border.

Another object of the invention is to provide a system for determining a threat against a border from objects crossing or trying to cross said border. Said system includes at least a plurality of detectors detecting incidents occurring at the border, a border management unit with interfaces to the detectors, a statistics unit adapted to extract the number of incidents in a border element and per threat potential category, a threat calculations unit for generating overview diagrams of threat data and trends in border situation development, wherein said border management unit includes a display unit for presenting said diagrams and trends.

BRIEF DESCRIPTION OF THE DRAWINGS

The invention will now be described in detail in reference to the appended drawings, in which.

DETAILED DESCRIPTION

Figure 1:
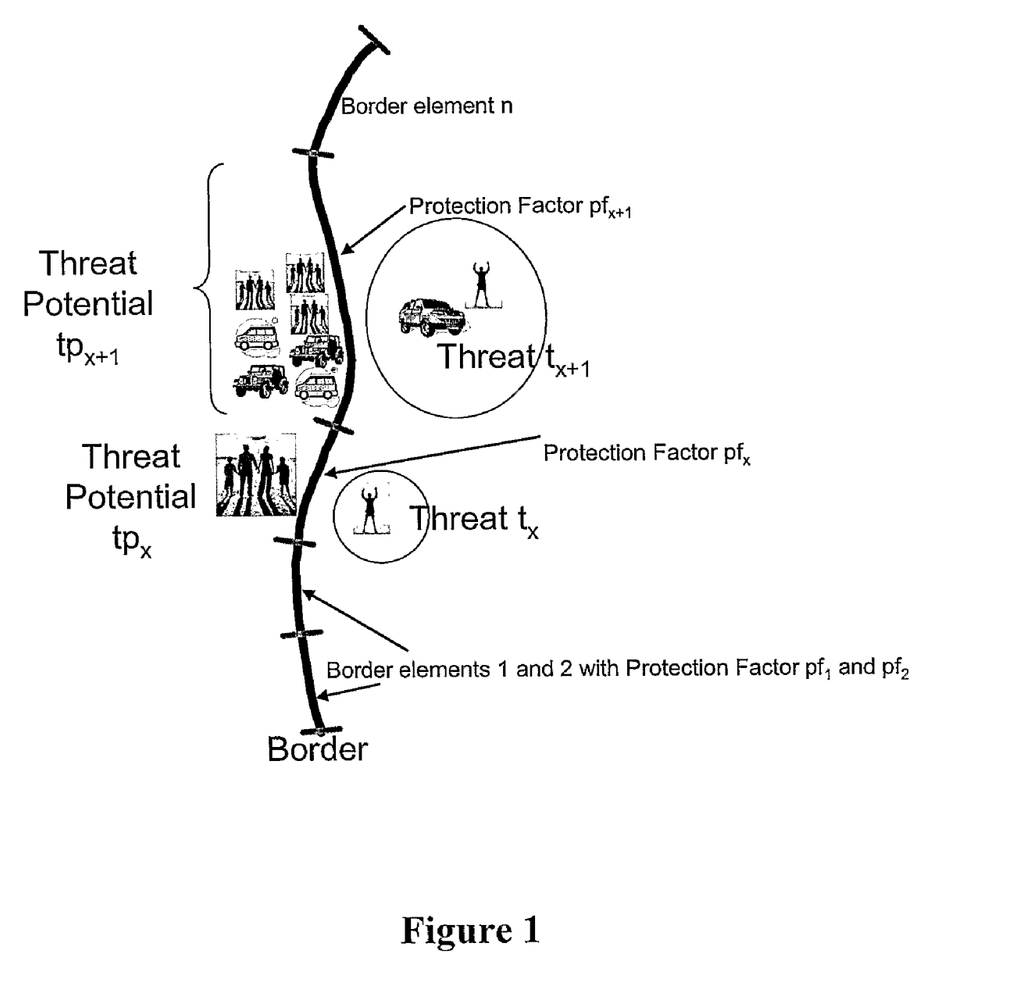
FIG. 1 is a schematic view of a border zone explaining the various parameters used in the present invention.

The invention is based on a method of calculating the border threat as described below:

To establish a methodical approach, the border has to be broken down into Elements (lengths of border) small enough to have uniform terrain features, infrastructure and weather conditions, as illustrated in FIG. 1. This is necessary to be able to establish the correct threat for each part of the border. For doing the correct splitting into elements, the following tools are needed or helpful:
  Good resolution topographical/vector maps of border area
  Best possible aerial pictures/satellite pictures of border area
  Preferably, also local pictures and experience from site survey along the border The threat itself is the result of two factors: The Threat Potential (TP) and the Protection Factor (PF). The TP will always have a value higher than 0 due to such factors as differences in economy, social conditions or country location (transit to other countries). It is important to note that the threat can be low even though the TP is high, due to a high PF.

The Threat Potential is a parameter expressing:
  The presence of potential border violators
  The type of violators including their determination to enter (e.g. work-seeking persons, smugglers, terrorists)

The Protection Factor is a parameter expressing the existing protection of the border:
  The difficulty of the terrain (e.g. mountains, deserts, roads, paths, woods)
  Weather (time of year, temperature, precipitation)
  The distance to villages, cities from the border (both sides)
  The infrastructure (roads, canals)
  The presence of Border Guards (deterrence)
  The presence of technical systems (deterrence)
  Less important factors dependent on local conditions The Protection Factor is a "resistance" to the Threat Potential, deciding the current of violators across the border at every point. This current must be seen as the real threat, giving:

T=TP/PF, or, since the total threat is the sum of the threat within the small elements:

$$T = \sum_1^n t_x$$

where tx is the threat within a given element and n is the number of elements that the border is split into. Each tx is calculated as tx=tpx/pfx where tpx is the threat potential in the element area and pfx is the Protection Factor for the element.

In this way, the problem is reduced to finding the values of the different factors within each small border element where the conditions can be seen as constant over the length of the element.

In FIG. 1 the border is segmented in a number of border elements 1-n. Each border element is the object of a threat potential $tp_1$-$tp_n$. $tp_x$ and $tp_{x+1}$ shows the threats posed against the border elements $t_x$ and $t_{x+1}$, respectively. Various measures are used to meet the treat potential, with the resulting protection factors $p_1$-$p_n$. The differences between the treat potentials and the protection factors form the treats $t_1$-$t_n$, which are numerical values indicating the influx of objects across the border.

Each parameter, how it is defined and determined numerically, will now be described in further detail.

Threat Potential (TP)

The TP must be calculated to be able to find the level of the potential, which in turn will give the threat T when a fixed Protection Factor is used. The TP consists of different objects such as work-seekers, organized criminals, terrorists, trespassers. Obviously, the impact of an object from one of these categories crossing the border will be very different. In the calculation of the threat T, each category must be treated separately, or for simplicity, the resulting TP level must be different. The last approach has been applied in the development of the method by using a consequence factor (c) to modify the TP value. The factor must be high for possible terrorists and correspondingly low for more innocent trespassers (people stepping over the border for a photo or for excitement). The protection measures against these threats will also have to be different, resulting in different technical solutions during the design.

The value of the TP will therefore depend on a lot of factors such as:

Type of object: Terrorist, activist, employee, work-seeker, other

Class of object: Foreign or domestic, terrorist or criminal, insider and/or outsider of the organization Objective of each type of object: Theft, sabotage, mass destruction (maximum casualties), socio-political statement, other Number of objects expected for each category:
  Individual suicide bomber, grouping or "cells" of operatives/terrorists, gangs, other Target selected by objects: Critical infrastructure, governmental buildings, national monuments, other Type of planning activities required to accomplish the objective: Long-term "casing," photography, monitoring police and security patrol patterns, other Most likely or "worst case" time an object could attack: When facility/location is fully staffed, at rush hour, at night, other Range of object tactics: Stealth, force, deceit, combination, other Capabilities of object: Knowledge, motivation, skills, weapons and tools These factors should ideally be taken into account when deciding the "consequence factor" described below.

The TP for a given category can be expressed as:
$tp_c = f \cdot c \cdot WF_{TP}$, and the total TP for a border element will be:

$$TP = \sum_{1}^{m} tp_c,$$

where m is the number of TP categories for the given element.
f=observed or estimated frequency of the given category in persons/day, or estimated frequency based on generally available information c=consequence factor for TP category (Whole number between 1 and 100 representing "damage units"/person)

WFTP=Weighting Factor for TP category (Whole number between 1 and 10, local factor for compensating the TP value for effects from Border Guard work pattern or similar known influences)

TP=threat potential in "damage units"/day

Protection Factor

This factor represents the "resistance" against the TP, deciding how many border violators that are able to actually cross the border and perform their damage (e.g. to people, to society, to economy).

The PF will be dependent on terrain, local infrastructure and technical protection system. A technical system may have patrols and other human elements as part of the system. In addition, the local weather may be both an increasing and a reducing factor. Bad weather may stop objects from trying to cross border in difficult areas, but it is well known that professional criminals uses bad weather to cover illegal crossings at some locations.

For calculating the threat per element, PF needs to be calculated per element, taking into account the abovementioned factors. A reasonable range providing necessary resolution for the PF is 1 to 1 000 where 1 represents a fully open border in simple terrain with supporting infrastructure. 1 000 represents a practically closed border with very difficult terrain, no infrastructure and heavy technical protection systems. The factor due to terrain+infrastructure and due to technical systems is equally important for the PF, so each of these may have values up to 500.

PF must be calculated by using the method of splitting the border into small elements that can be handled separately due to the need for reasonable constant conditions:

$pf_x = pf_{terrain} + pf_{tech}$ within a selected element with constant conditions.

Table 0-1 below shows typical factors used for terrain and infrastructure that may be used as guidelines when defining elements. Improved values must be obtained through experience.

TABLE 0-1

Typical PF for different terrains

| Terrain/infrastructure | Factor | Comments |
|---|---|---|
| High cliff | 480 | |
| High cliff + nearby roads | 400 | * |
| Mountainous terrain | 300 | |
| Mountainous + nearby roads | 250 | * |
| Desert area | 300-350 | Dependent on size and conditions |
| River | 100-350 | Depends on size and water flow. |
| Lake | 150-200 | |
| Forest | 250-300 | Dependent on type |
| Forest + nearby roads | 200-250 | * |
| Moor/swamp | 150-200 | Dependent of type |
| Moor/swamp + nearby roads | 100-150 | |
| Open fields | 10-50 | |
| Open fields + nearby roads | 1-20 | |
| Rural area | 20-50 | Dependent of type |
| Urban area | 1-2 | This factor shall never be less than 1. |

* Reduce by 50 if nearby roads at both sides

For typical values for different types of technical protection systems, see Table 0-1 below.

TABLE 0-1

Typical values of PF for technical systems

| Technical system | Factor | Comments |
| --- | --- | --- |
| Massive barrier | 400-500 | High steel or concrete barriers with sensors and digging obstructions |
| Active fences | 300-400 | Dependent on height and sensors |
| GSR and cameras | 250-350 | Dependent on location and use of towers |
| Camera chains along border | 200-300 | Dependent on camera distance and agility |
| PIR sensor chains + camera chains | 170-270 | |
| Long distance cameras | 150-250 | Dependent on locations, agility and automation |
| PIR sensor chains + long distance cameras | 50-100 | Dependant on sensor type and distance. |
| Line sensors (cables and/or electronic barriers) | 150-250 | Dependent on types and combinations |
| Heavy patrolled border | 100-200 | Dependant on pattern, frequency and terrain |
| Light patrolled border | 50-100 | Dependant on pattern and terrain |
| Decoys (camera, radar) | 50-100 | |
| Old fences & beamed roads | 1-10 | Dependent on status |
| No technical system | 0 | |

Using this method for each border element will enable calculation of the threat contribution from each element and the total threat for the border by using the formulas above.

Presentation of Results

The threat calculation may be done using a computer system adapted to automatically collect all information from detectors as well as reports from border patrols.

The result may be presented graphically as an aid to an operator/analyst at the border station enabling him/her to allocate or reallocate resources in a reliable way. In addition, the output from the computer system may be used to sound an alarm when there are substantial changes in the traffic pattern at the border.

Figure 2:
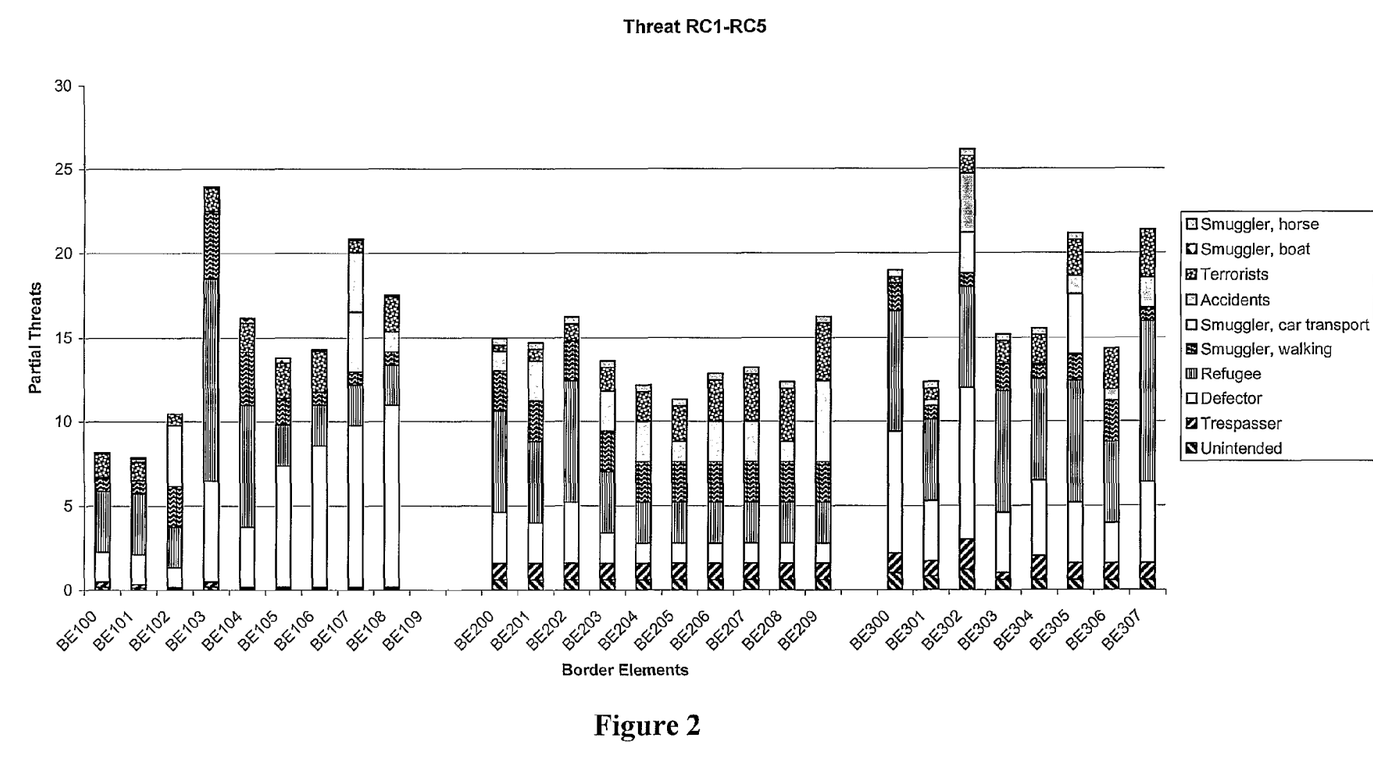
FIG. 2 is a diagram showing an example of threat curves.

Three main outputs of the method are Threat Potential curves, Protection Factor curves and Threat curves. An example showing the calculated curves is shown in FIG. 2.

The TP contributions from the different objects are shown with hatching in each bar. In this way, different countermeasures can be taken against each object category of the TP within each element. The result of the countermeasures can be seen on the corresponding Threat curves after calculating the PFs for the elements. The Threat diagram will show the influence of the protection countermeasures on the threat, element for element.

Figure 3:
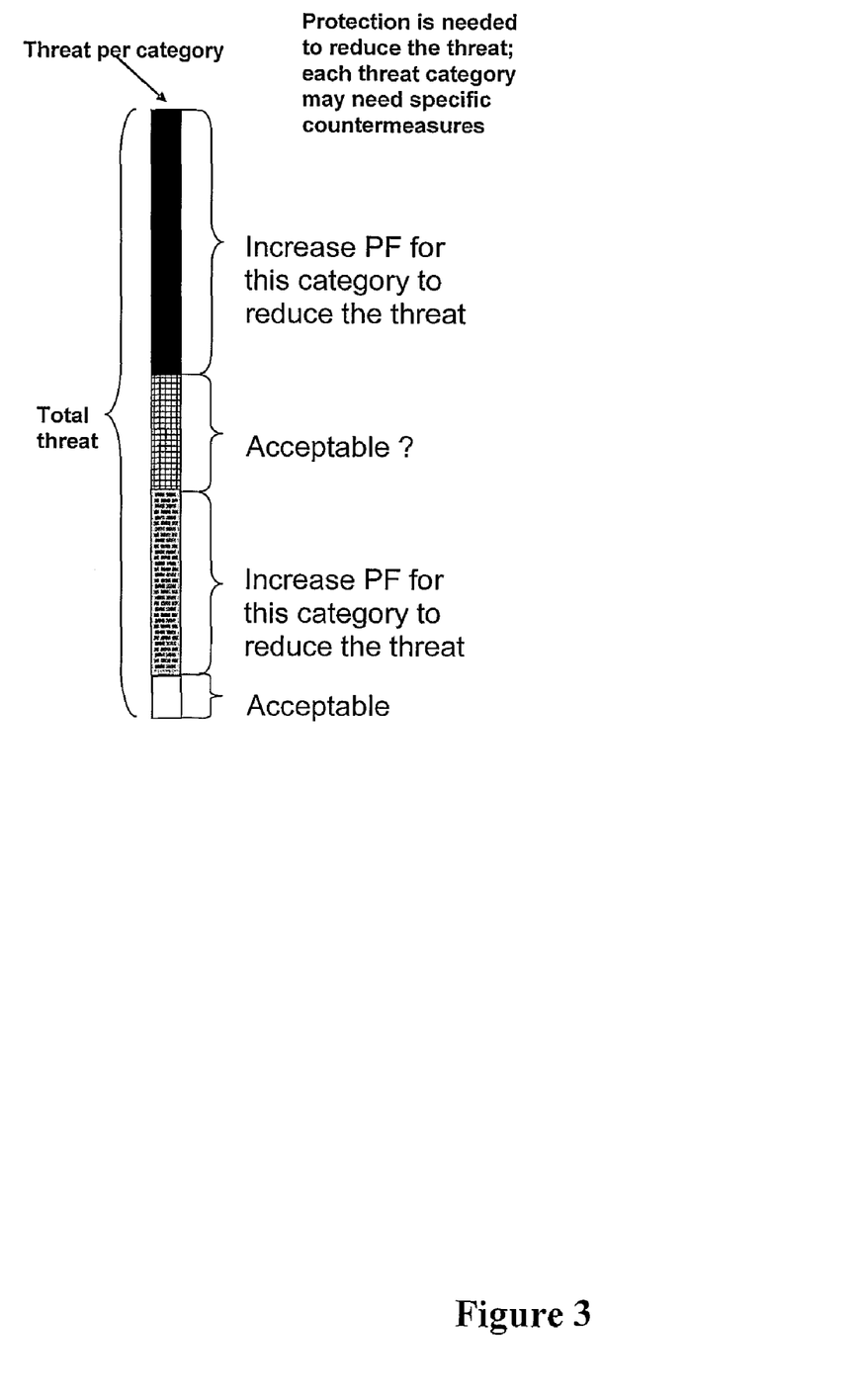
FIG. 3 is a diagram showing a detail of FIG. 2.

These diagrams are used in the design process of the technical system for protection of the border. The diagrams may be used to optimize the protection measures along the border. Ideally, the columns should be identical in height. The data may also be used in a dynamic process for securing the borders as explained below. One of the columns in FIG. 2 is shown I greater detail in FIG. 3. The height of the columns is a measure of how well this particular element of the border is protected. The size of each individual part of the column will tell the boarder guards where the effort should be concentrated if the situation must be improved.

These columns must be considered as snapshots of the situation since the threat will change as soon as changes of the protection system are done. Due to this fact, modular construction of border protection systems is required, and updates of the systems must be done frequently.

For an existing Border Protection system with a management system where all incidents are treated and reported, the method can be implemented and operate as part of the daily border protection. The system will then be a tool for the Border Guards for detecting and handling problem areas along the border as soon as they appear; e.g. using BG patrols or reinforcing the technical system.

Figure 4:
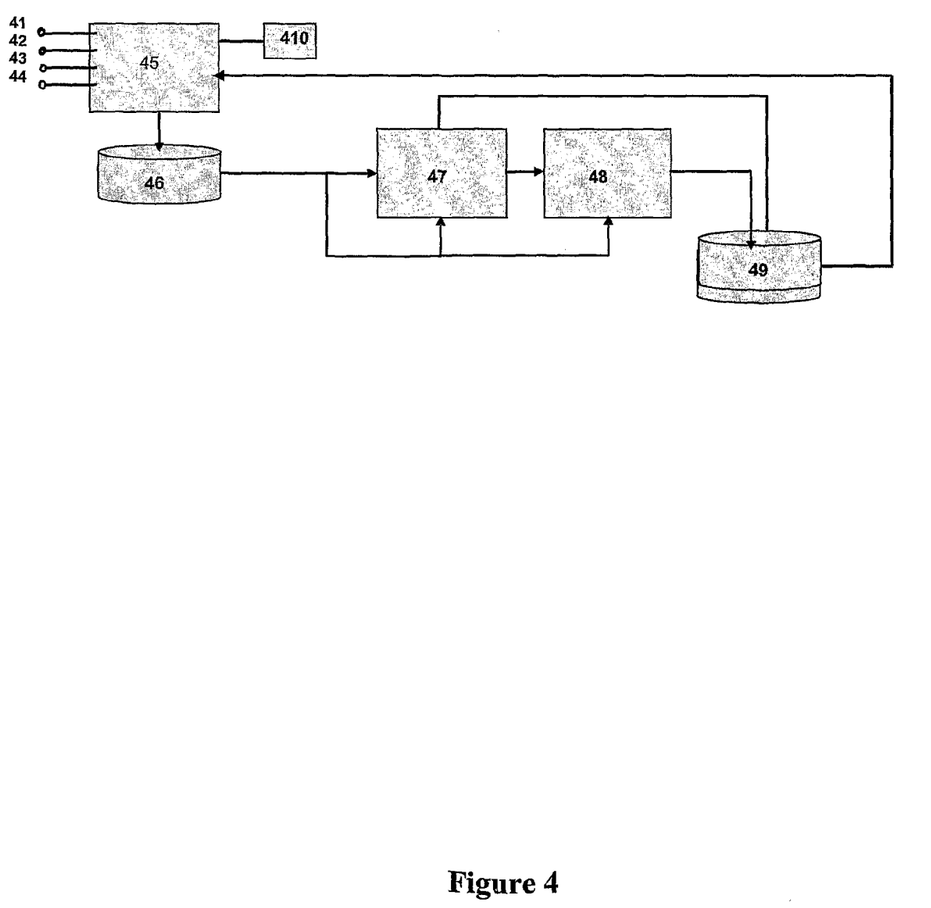
FIG. 4 is a schematic block diagram of a system according to the present invention.

A block diagram for a system that can handle the statistical data, calculate and present the resulting Threat potential, Threat, Protection Factor and eventually trend overviews (diagrams) to the operators is shown in FIG. 4.

The system includes a border management unit 45 with interfaces to various detectors 41-44. This unit also includes a user interface allowing the border guards to manually enter information gained during patrols along the border as well as a display unit 410 for presenting threat curves and alarms. The border management unit 45 is connected to a database 46 storing all incidents. A statistics unit 47 is adapted to fetch data from the database 46.

The Statistics unit 47 extracts the number of incidents per border element and per threat potential category (for each update) that shall be used by the following Threat calculations unit 48 for generating overview diagrams of threat data and trends in the border situation development. Historical data are saved to be able to select the time period of interest, in history database 49. The results are returned to border management unit 45 for display or alarm.

The frequency of updates of the situation depends on the observed activity on a given border, and may vary from once a few hours to once a day. It is not expected that more frequent updates will give any improvement since data is dependent partly on operator handled data (reports from incidents), including field activity to check and/or apprehend objects.

The system will be able to give alarms when threat rises above given thresholds to warn dedicated operators (analysts) of potential problems due to change in behavior. Short term variations or season variations can be handled by the BG by redefining patrol activities or modifying the technical solution (e.g. add or move sensors/barriers).

Figure 5:
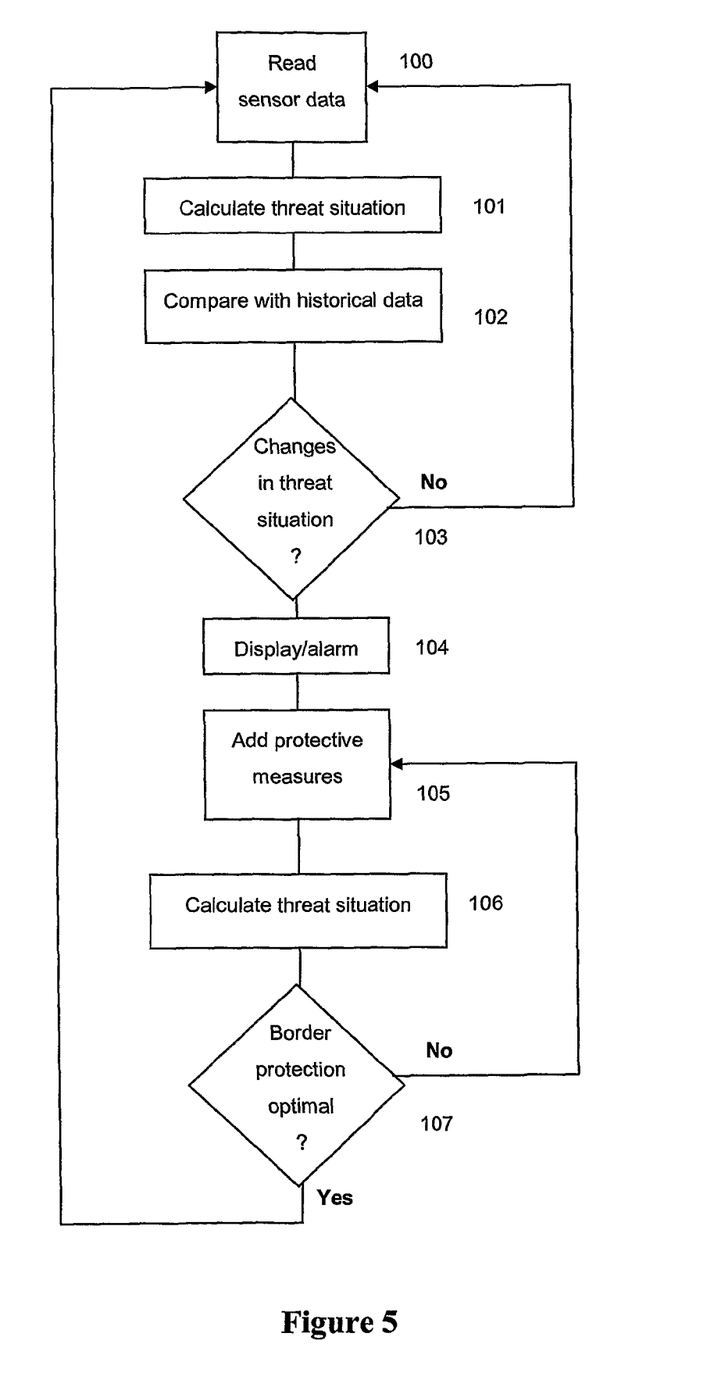
FIG. 5 is a flow diagram illustrating a use of the present invention.

FIG. 5 is a sequence diagram illustrating the steps taken in a system for surveying and maintenance of the protection of a border. In an initial step 100, the signals from the various sensors are received. Incidents reported by the sensors are stored and used to calculate the instant threat situation with the method described above, step 101. The newly calculated threat situation is compared with historical data (the previous calculation) in step 102. If this comparison indicates that the situation is stable, the process returns to step 100 for reading new signals from the sensors, step 103. However, if significant changes have occurred in the threat situation, an alarm is triggered, step 104. Then, various protective measures must be taken in step 105, as explained above. The new threat situation is determined in step 106 until an optimal border protection is achieved in step 107, i.e. the loop 105, 106, 107 will run until the border protection situation is satisfactory. At that stage, the process returns to step 100 and starts over again.

While the invention has been described in the context of a border protection system covering the borders of a country, it may as well be used for the protection of any large entity of great importance and which may be threatened from outside. Examples of large entities that may be analyzed and protected are power plants, airports, dams, defence industrial sites and sites with chemical/hazardous/nuclear waste protected by "local" border systems. The threats in question may include air and land borne vehicles, or sea and underwater vessels in addition to persons or groups of persons. The invention may also be used in other settings, to protect non-physical borders, e.g. for determining the threat situation in a large computer network. Then, recorded incidents of attempted break-ins must be compared with protective measures such as firewalls and potential risk elements such as inexperienced or inexact users. The invention may also be used by e.g. insurance companies to determine a threat situation, mapping recorded incidents against risk factors and protective measures.

The invention claimed is:

1. A method for determining a threat against a border from objects crossing or trying to cross said border, comprising the steps of:
    segmenting the border into border elements (1-n) of uniform terrain features, infrastructure and weather conditions;
    collecting data of incidents occurring along a given border element (x);
    determining a threat potential ($tp_x$) for said border element (x);
    determining a protection factor ($pf_x$) for the border element (x); and
    determining, by a computer system, a threat ($t_x$) against the border element (x) from the threat potential ($tp_x$) and protection factor ($pf_x$), and a threat T for the whole border comprising two or more border elements, wherein said threats are determined as:
    $t_x = tp_x / pf_x$ for the border element; and $$T = \sum_1^n t_x$$

for the whole border.

2. The method of claim 1, wherein said threat potential is determined by dividing said incidents into categories, and further comprising the step of determining the threat potential for each category ($tp_c$) as:

$$tp_c = f \cdot c \cdot WF_{TP};$$

and the total threat potential for the border element as:

$$TP = \sum_1^m tp_c;$$

where m is the number of threat potential categories for the given element;
f is observed or estimated frequency of the given category in objects/day;
c is consequence factor for threat potential category in damage units per object; and
$WF_{TP}$ is Weighting Factor for threat potential category for compensating the threat potential value for effects from known influences.

3. The method of claim 1, wherein said protection factor is determined by assigning protection factor values to individual protection elements of terrain, infrastructure and technical protection systems, and summing said values for protection elements present in the border element.

4. The method of claim 1, further comprising:
    comparing the threat to a threat value threshold; and
    in response to determining the threat exceeds the threat value threshold, issuing an alarm.

5. The method of claim 1, for use in allocating protective measures along a border.

6. A system for determining a threat against a border from objects crossing or trying to cross said border, comprising:
    a plurality of detectors adapted to detect incidents occurring at the border, wherein the border is segmented into border elements (1-n) of uniform terrain features, infrastructure and weather conditions;
    a border management unit interfaced to the detectors;
    a statistics unit coupled to the border management unit and adapted to extract the number of incidents in a border element and per threat potential category; and
    a threat calculations unit coupled to the statistics unit for generating overview diagrams of threat data and trends in border situation development, wherein the threat calculations unit is configured for:
        collecting data of incidents occurring along a given border element (x);
        determining a threat potential ($tp_x$) for said border element (x);
        determining a protection factor ($pf_x$) for the border element (x); and
        determining, by a computer system, a threat ($t_x$) against the border element (x) from the threat potential ($tp_x$) and protection factor ($pf_x$), and a threat T for the whole border comprising two or more border elements, wherein said threats are determined as:
        $t_x = tp_x / pf_x$ for the border element; and $$T = \sum_1^n t_x$$

for the whole border;
    said border management unit including a display unit for presenting said diagrams and trends.

7. The system of claim 6, wherein the border management unit is adapted to provide an alarm in response to determining that a threat data value rises above a predefined threshold.

8. The system of claim 6, wherein the system includes a first database storing all incidents occurring at the border.

9. The system of claim 6, wherein the system includes a history database storing threat data received from said threat calculations unit.

10. The system of claim 6, wherein the border management unit includes an interface allowing manual entering of information supplied by border patrols.

* * * * *

UNITED STATES PATENT AND TRADEMARK OFFICE
CERTIFICATE OF CORRECTION

PATENT NO. : 8,346,592 B2
APPLICATION NO. : 12/444816
DATED : January 1, 2013
INVENTOR(S) : Torvmark et al.

It is certified that error appears in the above-identified patent and that said Letters Patent is hereby corrected as shown below:

In Column 2, Line 66, delete "tx" and insert -- $t_x$ --, therefor.

In Column 2, Line 67, delete "tx" and insert -- $t_x$ --, therefor.

In Column 3, Line 1, delete "tx=tpx/pfx where tpx" and insert -- $t_x=tp_x/pf_x$ where $tp_x$ --, therefor.

In Column 3, Line 2, delete "pfx" and insert -- $pf_x$ --, therefor.

In Column 3, Line 11, delete "treat" and insert -- threat --, therefor.

In Column 3, Line 12, delete "treat" and insert -- threat --, therefor.

In Column 3, Line 13, delete "treats" and insert -- threats --, therefor.

In Column 4, Line 3, delete "WFTP" and insert -- $WF_{TP}$ --, therefor.

In Column 5, Line 66, delete "boarder" and insert -- border --, therefor.

Signed and Sealed this
Ninth Day of April, 2013

Teresa Stanek Rea
*Acting Director of the United States Patent and Trademark Office*